United States Patent
Teno, III

(10) Patent No.: US 8,991,842 B1
(45) Date of Patent: Mar. 31, 2015

(54) AMBULATORY FRAME ASSEMBLY

(71) Applicant: Albert D. Teno, III, Jeanerette, LA (US)

(72) Inventor: Albert D. Teno, III, Jeanerette, LA (US)

( * ) Notice: Subject to any disclaimer, the term of this patent is extended or adjusted under 35 U.S.C. 154(b) by 0 days.

(21) Appl. No.: 13/943,301

(22) Filed: Jul. 16, 2013

(51) Int. Cl.
*B60R 3/00* (2006.01)
*B60R 3/02* (2006.01)

(52) U.S. Cl.
CPC ........................... *B60R 3/02* (2013.01)
USPC ............................................ 280/163

(58) Field of Classification Search
USPC ................................ 280/163–166
See application file for complete search history.

(56) References Cited

U.S. PATENT DOCUMENTS

| | | | |
|---|---|---|---|
| 4,106,790 A | 8/1978 | Weiler | |
| 4,194,754 A | 3/1980 | Hightower | |
| 4,216,725 A * | 8/1980 | Hallam | 105/348 |
| 4,556,125 A | 12/1985 | Johnson | |
| 5,228,707 A | 7/1993 | Yoder | |
| 5,617,930 A | 4/1997 | Elia | |
| 6,270,139 B1 | 8/2001 | Simpson | |
| 6,840,526 B2 | 1/2005 | Anderson et al. | |
| 7,111,858 B2 | 9/2006 | Manser et al. | |
| 7,168,722 B1 * | 1/2007 | Piotrowski et al. | 280/166 |
| D652,776 S | 1/2012 | Agoncillo et al. | |

* cited by examiner

*Primary Examiner* — John Walters
*Assistant Examiner* — James Triggs

(57) ABSTRACT

An ambulatory frame assembly for exiting a vehicle in an emergency includes a frame that is operationally coupled to the vehicle. The frame is selectably extended outwardly from the vehicle so the frame may selectively support a user. A step is coupled to the frame so the user walks on the step. A support is operationally coupled to the frame. The support is movable after the frame is extended outwardly from the vehicle. A rail is operationally coupled to the arm. The rail is selectively positionable to be gripped by the user after the frame is extended outwardly from the vehicle.

19 Claims, 3 Drawing Sheets

US 8,991,842 B1

AMBULATORY FRAME ASSEMBLY

BACKGROUND OF THE DISCLOSURE

1. Field of the Disclosure

The disclosure relates to ambulatory frame devices and more particularly pertains to a new ambulatory frame device for exiting a vehicle in an emergency.

2. Summary of the Disclosure

An embodiment of the disclosure meets the needs presented above by generally comprising a frame that is operationally coupled to the vehicle. The frame is selectably extended outwardly from the vehicle so the frame may selectively support a user. A step is coupled to the frame so the user walks on the step. A support is operationally coupled to the frame. The support is movable after the frame is extended outwardly from the vehicle. A rail is operationally coupled to the arm. The rail is selectively positionable to be gripped by the user after the frame is extended outwardly from the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
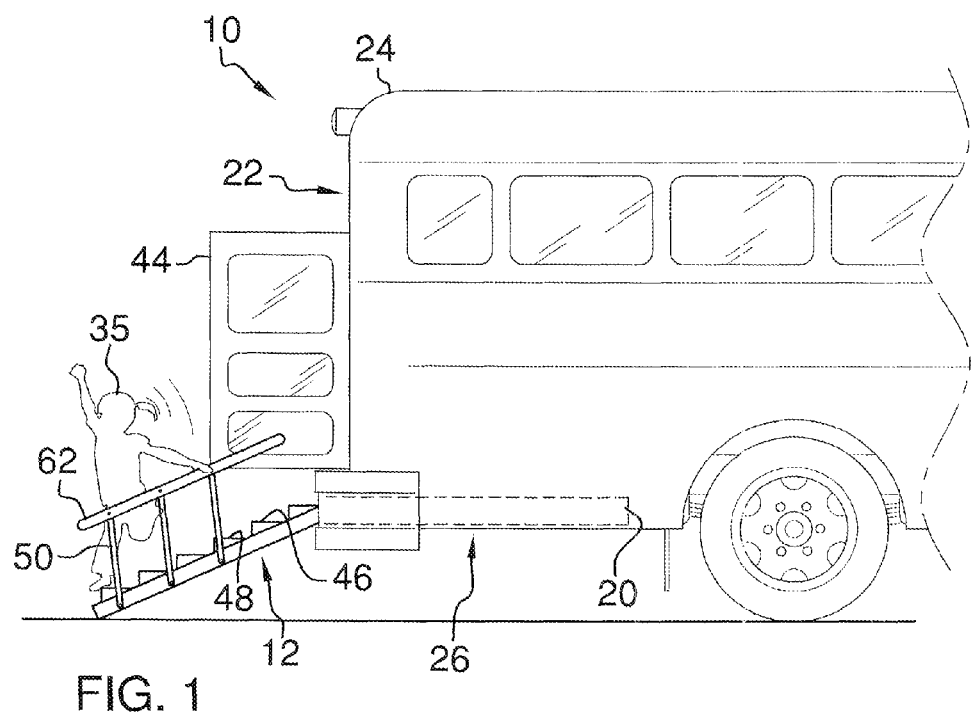
FIG. 1 is an in-use view of a ambulatory frame assembly according to an embodiment of the disclosure.
Figure 2:
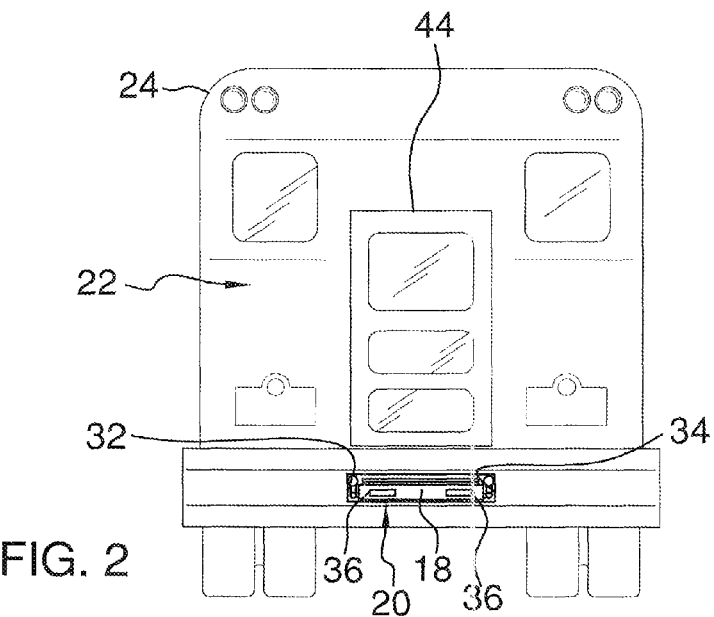
FIG. 2 is a back view of an embodiment of the disclosure.
Figure 3:
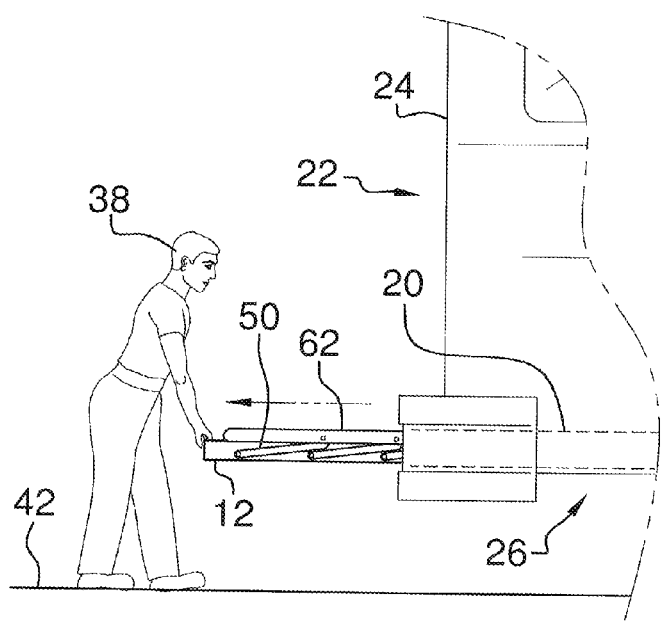
FIG. 3 is a right side view of an embodiment of the disclosure.
Figure 4:
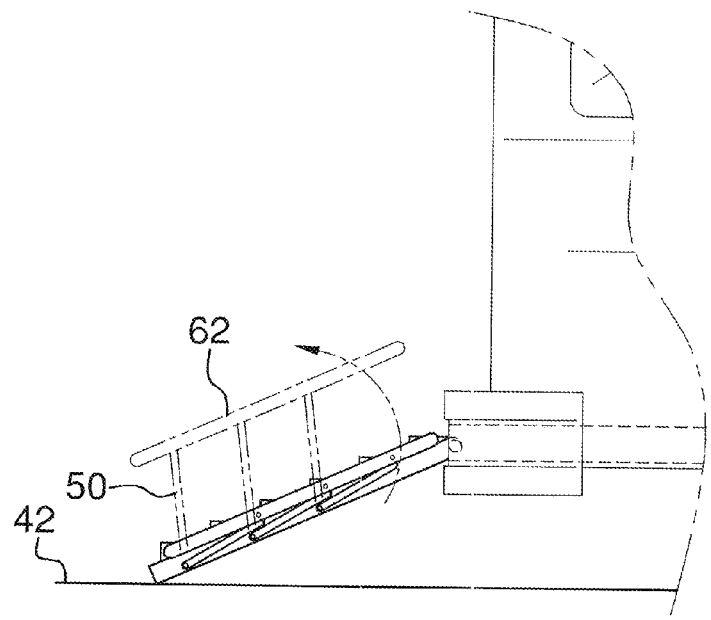
FIG. 4 is a right side perspective view of an embodiment of the disclosure.
Figure 5:
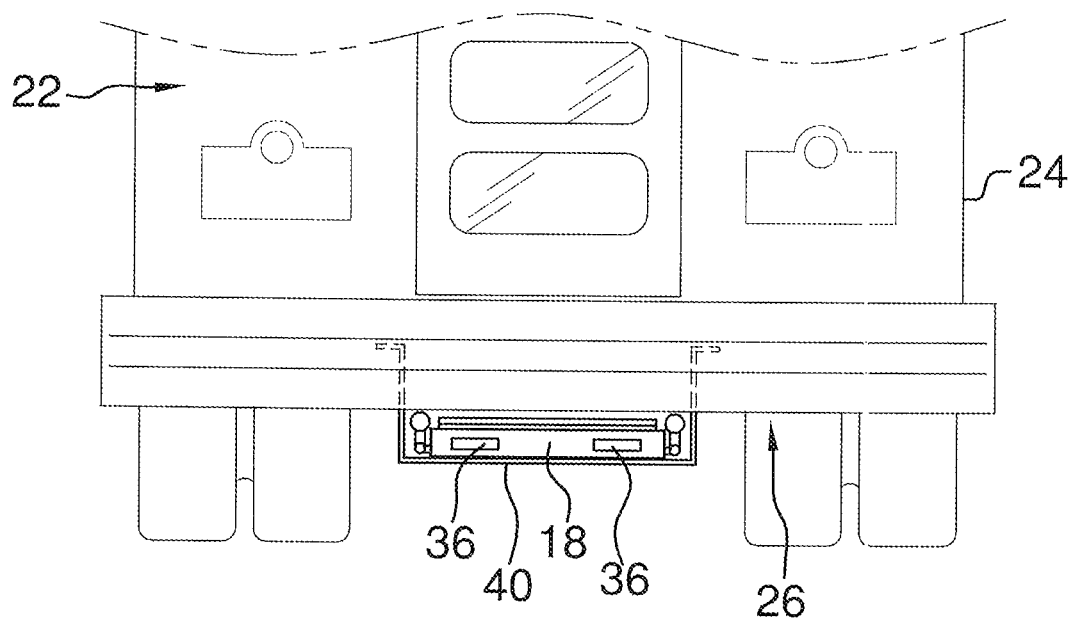
FIG. 5 is a back view of an alternative embodiment of the disclosure.
Figure 6:
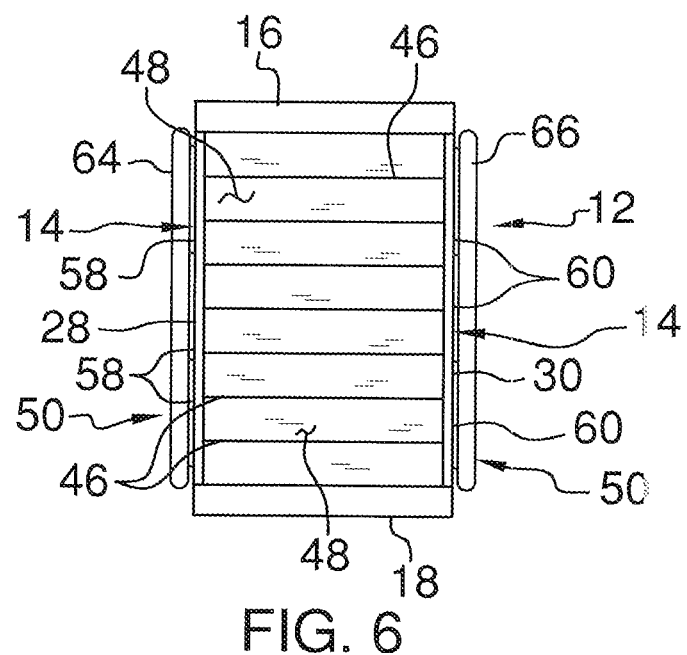
FIG. 6 is a top view of an alternative embodiment of the disclosure.

With reference now to the drawings, and in particular to FIGS. 1 through 6 thereof, a new ambulatory frame device embodying the principles and concepts of an embodiment of the disclosure and generally designated by the reference numeral 10 will be described.

As best illustrated in FIGS. 1 through 6, the ambulatory frame assembly 10 generally comprises a frame 12 that comprises a pair of lateral arms 14 coupled to and extending between each of a front arm 16 and a rear arm 18 of the frame 12. The frame 12 has a rectangular shape that may have a length between 1.5 m and 2 m and a width between 60 cm and 90 cm. Moreover, the frame 12 is positioned in a storage space 20 that extends into a rear 22 of a vehicle 24 proximate a bottom 26 of the vehicle 24. Each of a first one 28 and second one 30 of the pair of lateral arms 14 of the frame 12 is operationally coupled to an associated one of a first lateral side 32 and a second lateral side 34 of the storage space 20. A pair of handles 36 is coupled to the rear arm 18 of the frame 12 so a user 38 may grip the frame 12. Alternatively, the frame 2 may be slidably positioned within a bracket 40 that is coupled to the bottom 26 of the vehicle 24 proximate the rear 22 of the vehicle 24.

The frame 12 is selectively positionable in an extended position so the frame 12 is extended outwardly from the rear 22 of the vehicle 24. In the extended position, the rear arm 18 of the frame 12 is positioned on a support surface 42 and the front arm 16 of the frame 12 is positioned proximate the rear 22 of the vehicle 24. The support surface 42 may be Earth. Moreover, each of the first 28 and second 30 lateral arms of the frame 12 extends between the support surface 42 and the rear 22 of the vehicle 24 so the frame 12 may selectively support the user 38. The vehicle 12 may be a school bus or other vehicle 12 used to transport a plurality of passengers 25. Lastly, the storage space 20 is positioned below an emergency exit 44 of the vehicle 24 so the frame 12 may allow the passenger 25 to safely egress the vehicle 24 in the event of an emergency.

A step 46 is coupled between each of the first 28 and second 30 lateral arms of the frame 12. A top surface 48 of the step 46 lies on a plane that is parallel to the support surface 42 when the frame 12 is positioned in the extended position so the passenger 35 may walk on the step 46. The step 46 is one of a plurality of steps 46. Additionally, the plurality of steps 46 is evenly distributed between the front arm 16 and the rear arm 18 of the frame 12. Each of the plurality of the steps 46 is sequentially positioned closer to the support surface 42 between the front 16 and rear 18 arms of the frame 12 when the frame 12 is positioned in the extended position. Lastly, the plurality of steps 46 allows the passenger 25 to walk downwardly from the emergency exit 44 of the vehicle 24 to the support surface 42.

A support 50 is provided. The support is elongated along a longitudinal axis extending between a bottom end 52 of the support 50 and a top end 54 of the support. The bottom end 52 of the support 50 is rotatably coupled to the frame 12 proximate a bottom edge 56 of the frame 12. The support 50 may have a length between 75 cm and 100 cm. Moreover, the support 50 is positionable between an extended position and a stored position.

The support 50 is one of a plurality of supports 50 that is evenly distributed between the front arm 16 and the rear arm 18 of the frame 12. Continuing, the plurality of supports 50 comprises a pair of sets of the plurality of supports 50. A first one of the pair of sets 58 of the plurality of supports 50 is positioned on the first lateral arm 28 of the frame 12. A second one of the pair of sets 60 of the plurality of supports 50 is positioned on the second lateral arm 30 of the frame 12. In the extended position, the first 58 and second 60 sets of supports extends upwardly from the associated one of the first 28 and second 30 lateral arms of the frame 12. In the stored position, the first 58 and second 60 sets of supports extends laterally along the associated one of the first 28 and second 30 lateral arms of the frame 12.

A rail 62 is movably coupled to the top end 54 of the plurality of supports 50 so the rail 62 extends between the front arm 16 and the rear arm 18 of the frame 12. Continuing, the rail 62 is spaced upwardly away from the frame 12 when the plurality of supports 50 is positioned in the deployed position so the rail 62 may be gripped by the passenger 35. The rail 62 is positioned proximate the frame 12 when the plurality of supports 50 is positioned in the stored position. Finally, the rail 62 may have a length between 1 m and 1.5 m.

The rail 62 is one of a pair of rails 62. A first one of the pair of rails 64 is movably coupled to the first set of supports 58. A second one of the pair of rails 66 is movably coupled to the second set of supports 60. Finally, the first 58 and second 60 sets of supports may be independently positioned between the deployed positions and the stored positions.

In use, the user 38 grips the handles 36 on the rear arm 18 of the frame 12. The user 38 pulls the frame 12 into the extended position and places the rear arm 18 of the frame 12 on the support surface 42. Continuing, the user 38 positions each of the first 58 and second 60 sets of supports in the extended position. Lastly, the passengers 35 in the vehicle 14 exit the vehicle 24 through the emergency exit 44 and walk down the steps 46 to the support surface 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An ambulatory frame assembly for exiting a vehicle in an emergency, said assembly comprising:
    a frame operationally coupled to the vehicle wherein said frame is selectably extended outwardly from the vehicle wherein said frame is configured to selectively support a user;
    a step coupled to said frame wherein the user walks on said step;
    a support operationally coupled to said frame wherein said support is movable after said frame is extended outwardly from the vehicle;
    a rail operationally coupled to said arm wherein said rail is selectively positionable to be gripped by the user after said frame is extended outwardly from the vehicle;
    a bottom end of said support being rotatably coupled to said frame proximate a bottom edge of said frame wherein said support is positionable between an extended position and a stored position; and
    said support being one of a plurality of said supports being evenly distributed between a front arm and a rear arm of said frame.

2. The assembly according to claim 1, further comprising said frame comprising a pair of lateral arms coupled to and extending between each of a front arm and a rear arm of said frame wherein said frame has a rectangular shape.

3. The assembly according to claim 1, further comprising said frame being positioned in a storage space extending into a rear of the vehicle proximate a bottom of the vehicle wherein each of a first lateral arm and a second lateral arm of said frame slidably engages the vehicle.

4. The assembly according to claim 1, further comprising said frame being selectively positionable in an extended position wherein said frame is extended outwardly from a rear of the vehicle wherein a rear arm of said frame is positioned on a support surface and a front arm of said frame is positioned proximate the rear of the vehicle wherein each of a first and second lateral arm of said frame extends between the support surface and the rear of the vehicle.

5. The assembly according to claim 1, further comprising said step being coupled between each of a first and a second lateral arm of said frame wherein a top surface of said step lies on a plane being parallel to the support surface when said frame is positioned in an extended position.

6. The assembly according to claim 1, further comprising said step being one of a plurality of said steps.

7. The assembly according to claim 6, further comprising said plurality of steps being evenly distributed between a front arm and a rear arm of said frame wherein each of said plurality of said steps is sequentially positioned closer to the support surface between said front and rear arms of said frame when said frame is positioned in an extended position.

8. The assembly according to claim 1, further comprising said plurality of said supports comprising a pair of sets of said plurality of supports.

9. The assembly according to claim 8, further comprising a first one of said pair of sets of said plurality of supports being positioned on a first lateral arm of said frame, a second one of said pair of sets of said plurality of supports being positioned on a second lateral arm of said frame.

10. The assembly according to claim 1, further comprising a rail movably coupled to a top end of a plurality of said supports wherein said rail extends between a front arm and a rear arm of said frame.

11. The assembly according to claim 10, further comprising said rail being spaced upwardly away from said frame when said plurality of supports is positioned in a deployed position wherein said rail is configured to be gripped by the user, said rail being positioned proximate said frame when said plurality of supports is positioned in a stored position.

12. The assembly according to claim 10, further comprising said rail being one of a pair of said rails.

13. The assembly according to claim 11, further comprising a first one of said pair of rails being movably coupled to a first set of said plurality of supports, a second one of said pair of rails being movably coupled to a second set of said plurality of supports.

14. An ambulatory frame assembly for exiting a vehicle in an emergency, said assembly comprising:
    a frame comprising a pair of lateral arms coupled to and extending between each of a front arm and a rear arm of said frame wherein said frame has a rectangular shape, said frame being positioned in a storage space extending into a rear of the vehicle proximate a bottom of the vehicle wherein each of said first and second lateral arms of said frame slidably engages the vehicle, said frame being selectively positionable in an extended position wherein said frame is extended outwardly from the rear of the vehicle wherein said rear arm of said frame is positioned on a support surface and said front arm of said frame is positioned proximate the rear of the vehicle wherein each of said first and second lateral arms of said frame extends between the support surface and the rear of the vehicle wherein said frame is configured to selectively support a user;
    a step coupled between each of said first and second lateral arms of said frame wherein a top surface of said step lies on a plane being parallel to the support surface when said frame is positioned in said extended position wherein the user walks on said step, said step being one of a plurality of said steps, said plurality of steps being evenly distributed between said front arm and said rear arm of said frame wherein each of said plurality of said steps is sequentially positioned closer to the support surface between said front and rear arms of said frame when said frame is positioned in said extended position, coupled to said frame;

a support comprising a bottom end of said support being rotatably coupled to said frame proximate a bottom edge of said frame wherein said support is positionable between an extended position and a stored position, said support being one of a plurality of said supports being evenly distributed between said front arm and said rear arm of said frame, said plurality of supports comprising a pair of sets of said plurality of supports, a first one of said pair of sets of said plurality of supports being positioned on said first lateral arm of said frame, a second one of said pair of sets of said plurality of supports being positioned on said second lateral arm of said frame, and a rail movably coupled to a top end of said plurality of supports wherein said rail extends between said front arm and said rear arm of said frame, said rail being spaced upwardly away from said frame when said plurality of supports is positioned in said deployed position wherein said rail is configured to be gripped by the user, said rail being positioned proximate said frame when said plurality of supports is positioned in said stored position, said rail being one of a pair of said rails, a first one of said pair of rails being movably coupled to said first set of said plurality of supports, a second one of said pair of rails being movably coupled to said second set of said plurality of supports.

15. An ambulatory frame assembly for exiting a vehicle in an emergency, said assembly comprising:

a frame operationally coupled to the vehicle wherein said frame is selectably extended outwardly from the vehicle wherein said frame is configured to selectively support a user;

a step coupled to said frame wherein the user walks on said step;

a plurality of supports operationally coupled to said frame wherein each of said plurality of supports is movable after said frame is extended outwardly from the vehicle;

a rail operationally coupled to said arm wherein said rail is selectively positionable to be gripped by the user after said frame is extended outwardly from the vehicle; and a rail movably coupled to a top end of a plurality of said supports wherein said rail extends between a front arm and a rear arm of said frame, said rail being one of a pair of said rails.

16. The assembly according to claim 15, further comprising said step being one of a plurality of said steps.

17. The assembly according to claim 16, further comprising said plurality of steps being evenly distributed between a front arm and a rear arm of said frame wherein each of said plurality of said steps is sequentially positioned closer to the support surface between said front and rear arms of said frame when said frame is positioned in an extended position.

18. The assembly according to claim 15, further comprising said rail being spaced upwardly away from said frame when said plurality of supports is positioned in a deployed position wherein said rail is configured to be gripped by the user, said rail being positioned proximate said frame when said plurality of supports is positioned in a stored position.

19. The assembly according to claim 15, further comprising a first one of said pair of rails being movably coupled to a first set of said plurality of supports, a second one of said pair of rails being movably coupled to a second set of said plurality of supports.

* * * * *